United States Patent Office 3,346,580
Patented Oct. 10, 1967

3,346,580
D-LYSERGIC ACID AMIDES
Albert Hofmann and Franz Troxler, Bottmingen, Switzerland, and Hans Ott, Hanover, N.J., assignors to Sandoz Ltd. (also known as Sandoz A.G.), Basel, Switzerland
No Drawing. Filed Feb. 5, 1964, Ser. No. 342,803
Claims priority, application Switzerland, Feb. 7, 1963, 1,545/63
3 Claims. (Cl. 260—285.5)

The present invention relates to new d-lysergic acid amides and to a process for their production.

The present invention provides compounds of the general Formula I,

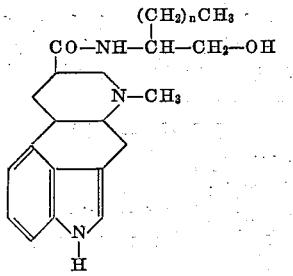

in which $n$ is one of the integers from 3 to 5 and their acid addition salts and pharmaceutical compositions containing, in addition to a physiologically acceptable, non-toxic, inert carrier, a compound I and/or an acid addition salt thereof.

The present invention further provides a process for the production of compounds I and their acid addition salts, which comprises reacting a sufficiently reactable functional acid derivative of a compound of the general Formula III,

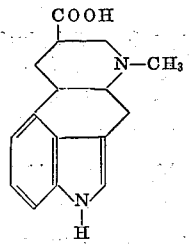

with a (+)-hydroxy alkyl amine of the general Formula II,

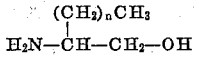

II in which $n$ has the above significance, and when an acid addition salt is required, salifying the resulting compound I with an organic or inorganic acid in manner known per se.

The term "known per se" as used herein signifies methods currently in use or described in the literature on the subject.

Examples of the functional acid derivatives which may be used in accordance with the invention are the relative acid azides, acid chloride hydrochlorides or the anhydrides of a free acid of general Formula III with sulfuric acid.

The 9,10-dihydro-d-lysergic acid azides can be obtained by known methods from the corresponding hydrazides by reaction with nitrous acid and can be employed for the further condensation without first being isolated. The process is preferably effected as follows: A 9,10-dihydro-d-lysergic acid hydrazide is dissolved in an aqueous solution of 1 mol of inorganic acid and 1 mol of an aqueous sodium nitrite solution is added to this solution at a temperature near the freezing point. Subsequently, an aqueous solution of a further mol of an inorganic acid is added dropwise whilst the low temperature is maintained, the mixture is stirred for a few minutes, the reaction mixture made alkaline with an aqueous sodium bicarbonate solution and shaken out with a water immiscible organic solvent, e.g. ether or benzene. The resulting solution of a 9,10-dihydro-d-lysergic acid azide is well dried and an excess of a (+)-hydroxy alkyl amine of general Formula II (at least 2 mols) is added thereto whereupon the reaction mixture is left to stand for a number of hours at room temperature. Other acid binding agents may be used in place of the excess of amine, thus for example, a suspension of potassium carbonate in a mixture of the amine with isopropanol and absolute ether has been found to be advantageous. The working up of the mixture is preferably effected by methods which are known for the working up of amides of lysergic acid, e.g. chromatography and purification via salts with organic or inorganic acids.

The new lysergic acid amides of general Formula I may also be produced in accordance with the invention by reacting the mixed anhydride of sulfuric acid and a 9,10-dihydro-d-lysergic acid of general Formula III with a (+)-hydroxy alkyl amine of general Formula II. This process can preferably be effected as follows: One mol of an alkaline salt of a compound III is dissolved in a solution of 2 mols of sulfur trioxide in a suitable inorganic solvent (preferably acetonitrile or dimethyl formamide), the reaction mixture is left to stand for a few minutes at a temperature of between $-30$ and $+20°$ C. and 3 to 5 mols of a compound II are added to the resulting solution of the mixed anhydride, preferably after compound II has been diluted with the same solvent used above. For the purpose of working up the mixture, the resulting complex is degraded at a low temperature by the addition of water and the resulting two-phase mixture worked up in known manner, e.g. by extraction, chromatography and/or crystallization.

Furthermore, the compounds I may be obtained by conversion of 9,10-dihydro-d-lysergic acid chloride hydrochloride with an amine of general Formula II in an organic solvent. The process is preferably effected by suspending the acid chloride hydrochloride in absolute chloroform, carbon disulfide or a mixture of these two solvents with isopropanol or tertiary butanol and adding thereto an excess (at least 2 mols) of the amine component. In the event of the amine being used in a smaller excess, the addition of a tertiary base, preferably pyridine, is advantageous. The reaction solution is then diluted with water and the amide extracted with a water immiscible solvent. After evaporation of this solvent, the desired amide crystallizes from the evaporation residue either as the free base or may be isolated as a salt of an organic or inorganic acid.

The 9,10-dihydro-d-lysergic acid may, for example, be used as the acid component, and (+)-hexanol amine-(2), (+)-heptanol amine-(2) or (+)-octanol amine-(2) as the amine component.

The new lysergic acid amides produced in accordance with the invention are characterized by a strong hypotensive action wherein they differ radically from other hydroxy alkyl amides of the lysergic acid series (e.g. Methergin). The latter compound in fact causes a rise of blood pressure which lasts for a short time and which can, under certain circumstances, later be followed by a very small decrease of blood pressure. In contrast herewith, the compounds of the present invention cause an immediate substantial decrease of blood pressure which lasts for a relatively long time and is dependent upon the dosage. The pulse frequency remains unaltered or is slowed down very slightly. As the hypotensive effect of these new lysergic acid amides is the result of a peripheral vasodilation, the blood circulation in vitally important organs (e.g. the kidneys) is strongly increased. This longer lasting, dosage dependent blood pressure decrease accompanied by a marked increase of the peripheral circulation is new for lysergic acid derivatives and the compounds of the invention are thus to be used therapeutically. A further advantage of the compounds produced in accordance with the invention consists in that, in contrast to the already known lower alkanol amides of lysergic acid, they have no effect on the uterus in humans and, furthermore, have no other undesirable side effects.

The compounds of the invention may be used as pharmaceuticals as such or in the form of appropriate medicinal preparations for enteral or parenteral administration. In order to produce such medicinal preparations, the compounds of the invention are worked up with inorganic or organic adjuvants which are inert and physiologically acceptable. Examples of such adjuvants are as follows:

tablets and dragees: lactose, starch, talc and stearic acid;
syrups: cane sugar, invert sugar and glucose;
injectable solutions: water, alcohols, glycerine and vegetable oils;
suppositories: natural or hardened oils and waxes;
ointments, suspensions and emulsions: inorganic and organic lipophilic or hydrophilic compounds, paraffin, petroleum jelly, alginates, cellulose derivatives, polyoxyethylene derivatives, and bentonite.

The pharmaceutical preparations may contain one or more suitable preserving, stabilizing or wetting agents, solubilizers, sweetening and colouring substances or flavourings.

The invention thus includes pharmaceutical preparations containing, in addition to an inert physiologically acceptable carrier, a compound I and/or an acid addition salt thereof.

In the following non-limitative examples all temperatures are stated in degrees centigrade and the melting points are corrected.

*Example 1.—9,10-dihydro-d-lysergic acid-(+)-hexanol-amide-(2')*

10 ml. of a 1 N aqueous sodium nitrite solution are added to a solution of 2.82 g. of 9,10-dihydro-d-lysergic acid hydrazide in 100 ml. of 0.1 N hydrochloric acid at a temperature of 0–5° and thereupon 25 ml. of a 0.5 N hydrochloric acid solution are added dropwise thereto. This solution is made alkaline with a sodium bicarbonate solution after a further 5 minutes whilst cooling with ice and is then shaken a number of times with diethyl ether. The ethereal solution of the 9,10-dihydro-d-lysergic acid azide which has been dried over potassium carbonate is then poured into a suspension of 8.5 g. of potassium carbonate in a mixture of 1.5 g. of (+)-hexanol amine-(2) with 30 ml. of isopropanol and 60 ml. of abs. ether whilst stirring at a temperature of 5–15° and the mixture is then stirred for a further 16 hours, the temperature being allowed to rise to room temperature during the course of approximately 1 to 2 hours. The mixture is diluted with 300 ml. of water, the aqueous phase shaken a number of times with chloroform, the combined organic phases are dried over potassium carbonate and evaporated to dryness in a vacuum. The crude product consisting of 9,10-dihydro-d-lysergic acid-(+)-hexanol amide-(2') and 9,10-dihydro-d-isolysergic acid-(+)-hexanol amide-(2') is chromatographed on 75 g. of aluminium oxide whereupon the iso-compound is washed into the filtrate with absolute chloroform and the 9,10-dihydro-d-lysergic acid-(+)-hexanol amide-(2') is likewise washed into the filtrate with chloroform+1–2% ethanol. The melting point of the latter compound is 255° after crystallization from ethanol (prisms). $[\alpha]_D^{20} = -138°$ (c.=0.5 in pyridine). Keller's colour reaction: blue.

*Example 2.—9,10-dihydro-d-lysergic acid-(+)-heptanol amide-(2')*

This compound is produced from 9,10-dihydro-d-lysergic acid hydrazide and (+)-heptanol amide-(2) in a manner analogous to that described in Example 1. Melting point 247–249°, prisms from ethanol.

$$[\alpha]_D^{20} = -139°$$

(c.=0.5 in pyridine).

What is claimed is:

1. A compound selected from the group consisting of d-lysergic acid amides of the formula:

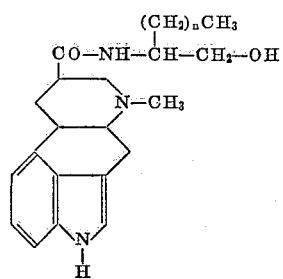

in which
n is an integer from 3 to 5 inclusive
and their pharmaceutically acceptable acid addition salts.

2. 9,10 - dihydro - d - lysergic acid-(+)-hexanolamide-(2') and its pharmaceutically acceptable acid addition salts.

3. 9,10 - dihydro-d-lysergic acid-(+)-heptanolamide-(2') and its pharmaceutically acceptable acid addition salts.

References Cited

UNITED STATES PATENTS 2,997,470  8/1961  Pioch _____ 260—285.5
3,113,133  12/1963  Hofmann et al. ____ 260—285.5

FOREIGN PATENTS 631,701  11/1961  Canada

ALEX MAZEL, *Primary Examiner.*

D. G. DAUS, *Assistant Examiner.*